United States Patent [19]

Ruscitto

[11] 4,054,882

[45] Oct. 18, 1977

[54] NON-SEQUENTIAL INK JET PRINTING

[75] Inventor: Paul Anthony Ruscitto, San Jose, Calif.

[73] Assignee: International Business Machines Corporation, Armonk, N.Y.

[21] Appl. No.: 325,494

[22] Filed: Jan. 22, 1973

[51] Int. Cl.[2] .............................................. G01D 15/18

[52] U.S. Cl. .............................................. 346/1; 346/75

[58] Field of Search ...................................... 346/75, 1

[56] References Cited

U.S. PATENT DOCUMENTS

| | | | |
|---|---|---|---|
| 3,560,641 | 2/1971 | Taylor et al. | 346/75 X |
| 3,769,631 | 10/1973 | Hill et al. | 346/75 |
| 3,813,676 | 5/1974 | Wolfe | 346/75 |

OTHER PUBLICATIONS

Gamblin et al.; Orthogonalization of Electrostatic Printing; IBM Tec. Disc. Bulletin, vol. 11, No. 10, Mar. 1969, pp. 1292-1293.

*Primary Examiner*—Joseph W. Hartary

*Attorney, Agent, or Firm*—John H. Holcombe; Otto Schmid, Jr.

[57] ABSTRACT

A method and apparatus for reducing the effects of electrostatic charge repulsion and aerodynamic drag on a stream of ink drops in an ink jet printer. This reduction is accomplished by the non-sequential printing of the ink drops as they issue from the nozzle, i.e., drops issuing sequentially from the nozzle are never printed adjacent to one another. This maximizes the inflight distance between successive ink drops, reducing drop interaction. The slight misalignment in the printing which results from the non-sequential printing may be corrected by either displacing the deflection plates a sufficient angle with respect to the print line or by a corrective signal added to the signal input so that the desired slant results with the non-sequential printing.

5 Claims, 6 Drawing Figures

NON-SEQUENTIAL INK JET PRINTING

FIELD OF THE INVENTION

This invention relates to a recording system which produces a record by depositing fluid drops upon a record medium, and more particularly to a method and apparatus for improving the drop registration of such a recording system.

BACKGROUND OF THE INVENTION

Various types of non-impact printing process have been developed because this approach offers attractive features such as increased speed and versatility in printing techniques. One form of non-impact printing process is ink jet printing and involves the modulation of a stream of fluid ink drops which are recorded on a record medium. Various types of ink jets systems presently exist. One such system employs a small nozzle to which fluid ink is delivered under pressure. As the ink exits the nozzle, instabilities due to surface tension forces cause the stream to break up into series of drops. This break up is synchronized by vibrating the fluid which results in uniform drop size and spacing. The rate of drop formation is synchronized with a charging means which induces an electrostatic charge upon each drop as it is formed, the size of the charge being directly related to the input signal voltage. The ink drops with their respective charges then pass through a constant electric field created by a pair of deflection plates which are maintained at a relatively high potential difference. The high electric field causes the ink drops to deflect according to the charge which they carry, with the ink drops then impacting the record medium sequentially (in the same order that they issue from the nozzle) or entering an ink sump for return to an ink reservoir.

Although legible printing results when this basic system is employed, two primary factors, aerodynamic and electrostatic interaction, have deleterious effects on the drops, which alter their inflight paths and result in degraded print quality or drop registration. The first, aerodynamic interaction, occurs as a result of the aerodynamic wake created by each drop as it passes through the air to the record medium. The effect of this wake is to alter the flight path of the drop immediately following because of their close proximity to one another. This flight path alteration is due to the fact that the wake of one drop tends to reduce the air drag of the succeeding drop causing the succeeding drop to remain in the electric field less time than the drop which creates the wake, thus being deflected less. In other words, succeeding drops meet less air resistance.

One approach to the aerodynamics interaction problem is to provide laminar air flows perpendicular to the print access of the ink stream in an attempt to minimize this effect. However, this requires additional engineering and adds to the complexity of the system. Also, an additional force imparted to the ink drops by the laminar air flow which must then be compensated for, thus making this approach to the aerodynamic problem unattractive.

The second factor, electrostatic interaction, whereby two successive drops may be either attracted or repelled by one another in accordance with their respective charges has a similar degrading affect upon the print quality. Once again this is due to the close proximity of the drops, which are printed sequentially. One approach to alleviate this electrostatic interaction has been to buffer the signal carrying charged drops with one or more uncharged drops. For example, every third drop carries a signal charge with the two intervening drops remaining uncharged and directed toward the sump. While drop registration is somewhat improved using this technique, the effect of using one or more drops between charged drops as buffers is to reduce the drop rate and thus the speed of printing. Not only is this undesirable but, aerodynamic interaction is still present with the approach.

OBJECTS OF THE INVENTION

Therefore, it is an object of this invention to reduce both the electrostatic and aerodynamic interaction of the ink drops in an ink jet printing system in an improved manner.

It is further object of this invention to reduce aerodynamic and electrostatic interaction among the drops without affecting the drop rate and have the printing speed of the system.

It is still a further object of this invention to reduce the aerodynamic interaction of the drops without the requirement of an additional air flow system.

SUMMARY OF THE INVENTION

The above objects are accomplished by changing the ordering of the signal level to the charge electrode so as to print the drops in an ink jet system in an order that is out of sequence with the order that they issue from the nozzle. This permits the use for printing of every drop generated while maximizing the inflight distance between the drops, which tends to minimize both the electrostatic and aerodynamic interaction. Any misalignment which results in the vertical print column may be corrected in various ways; for example, by a change in the bit train from the character generator or other information source, or by an angular displacement of the deflection plates about the stream axis. In this manner, drop interaction in an ink jet system may be controlled so as to provide acceptable drop registration.

In a system which employs character and symbol generators, these generators may be constructed so as to generate digital signals in a predetermined non-sequential manner. These generated signals are then converted to analog form and inputted to the charge electrode. Where the signals to be printed do not originate from non-sequential generators, they are first converted to digital form if they are not digital already, then translated to the predetermined non-sequential order and finally converted to analog form and inputted to the charge electrode.

The advantage of this technique is that, using known circuit techniques, the signal to the charge electrode charges the drops such that they are printed in a non-sequential order. Since all drops are available for printing, printing speed is not sacrificed, yet drop interaction is reduced.

DETAILED DESCRIPTION

Figure 1:
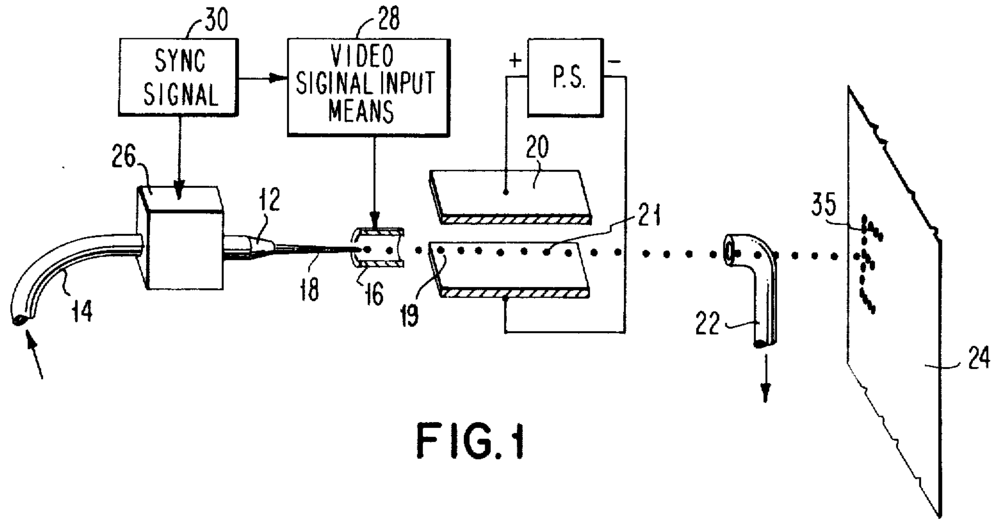
FIG. 1 shows in schematic form an ink jet system in which the invention is employed.

FIG. 1 shows an ink jet printing system in which the invention is employed to enhance the print quality (drop registration). Basically, the ink jet system consists of a small nozzle 12, having a small diameter orifice which is supplied a fluid such as ink under pressure by ink supply line 14 from an ink reservoir (not shown). Charge electrodes 16 is located in front of nozzle 12 such that ink stream 18 which is emitted by nozzle 12 passes through the field created by charge electrodes 16. Charge electrodes 16 are spaced from nozzle 12 at the point where ink stream 18 begins to break up into drops 19. A pair of deflection plates 20 are located about the ink stream axis 21 such that ink drops 19 after having passed through charge electrodes 16 pass through the electric field created by deflection plates 20. An ink gutter or sump 22 is positioned at a distance from the nozzle 12 such that ink drops having a specified charge (or no charge at all) enter sump 22 after having passed through the electric field created by deflection plates 20. Those ink drops 19 which are charged so as not to enter sump 22 then impact record medium 24, where indicia is formed. Disturbance transducer 26 is mounted on nozzle 12 so as to vibrate nozzle 12 at a high frequency. This vibration of nozzle 12 by disturbance transducer 26 causes ink stream 18 to break up into a series of drops 19 which have uniform size and spacing. Charge electrodes 16 function so as to impart an electrostatic charge to each drop as it breaks from the ink stream 18 according to a signal which originates from video signal input means 28. In order for video signal input means 28 to properly charge ink drops 19, it is synchronized with disturbance transducer 26 by sync means 30. The basic ink jet system is discussed in more detail in an article by Kamphoefner entitled "Ink Jet Printing," IEEE Transactions On Electron Devices, Vol. Ed-19, No. 4, April 1972, pp. 584–593.

In operation, ink supply line 14 supplies ink or other fluids under pressure to nozzle 12 from the fluid reservoir. The ink exits the nozzle 12 through a small orifice in an ink jet stream 18 which defines ink stream axis 21, but due to certain forces such as surface tension, the ink begins to break up into individual drops 19 at a determinable point from nozzle 12. The high frequency vibrations of disturbance transducer 26 which impart mechanical energy to the ink affects the breakup such that the drops are of uniform size and spacing. This breakup occurs in the area of charge electrodes 16 which are connected to video signal input means 28 which is synchronized with disturbance transducer 26 so as to properly charge ink drops 19. The function of video signal input means 28 is to impart an electrostatic charge to ink drops 19 in accordance with an input signal. Generally, the larger the amplitude of the voltage on charge electrodes 16, the greater the charge transferred to ink drops 19. Once the ink drops 19 have received an electrostatic charge from charge electrodes 16, they travel through a constant electric field created by a high voltage on deflection plates 20. The presence of the electrostatic charge on ink drops 19 causes them to deflect proportional to their individual charge as they pass through the constant electric field. Certain drops which are not programmed to impact record medium 24 receive a predetermined charge or no charge at all, depending on the system, which causes these particular ink drops to be deflected so as to enter ink gutter 22 which then returns these drops to the ink reservoir for reuse. The other drops which are not programmed to return to the reservoir continue on to impact record medium 24, resulting in printed information such as characters, symbols, graphics and the like.

Figure 2:
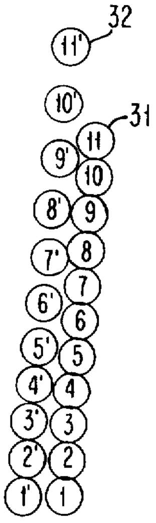
PRIOR ART FIG. 2
FIG. 2 demonstrates the effect of drop interaction during sequential printing.

Present techniques print ink drops sequentially, i.e., ink drops impact the record medium relative to one another in the same sequence which they issue from the nozzle. For example, in sequential printing, if a straight line were being printed, the second drop issuing from the nozzle would be printed next to the first drop print; the third drop next to the second; and so on. FIG. 2 shows the results of sequential printing, wherein the unprimed numbers 31 indicate the desired dot location and the primed numbers 32 indicate the actual dot location. The row of primed dots 32 has been displaced to the left for comparison with the row of unprimed dots 31. As is shown in FIG. 2, in actual printing, subsequent dots begin to drift vertically higher. This vertical drift is generally due to the longer transit time spent by drops 19 in the constant electric field, a phenomenon which is due in large measure to two factors. The first is that of electrostatic repulsion wherein preceding drops exert an impeding force on subsequent drops causing them to slow down. The second factor is that of aerodynamic interaction wherein preceding drops create an aerodynamic wake which creates a low resistance path for subsequent succeeding drops, resulting in a speed differential of the drops. The slowing effect of the repulsion factor causes the drops to remain in the constant electric field for a longer period of time then preceding drops, resulting in a greater deflection of the subsequent drops and thus the vertical drift of the printed dots 32.

Figure 3:
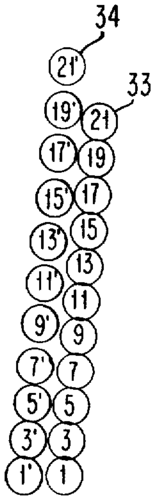
PRIOR ART FIG. 3
FIG. 3 demonstrates the effects of drop interaction in a system employing the drop guard technique.

A prior art technique which tends to reduce the electrostatic but not the aerodynamic, interaction of the drops is demonstrated in FIG. 3. Once again the unprimed numbers 33 indicate the desired dot location and the primed numbers 34 indicate the actual dot location. Basically, this technique consists of charging only selected ink drops, continually maintaining uncharged ink drops between the charged ink drops. This increases the distance between the charged ink drops and reduces the electrostatic interaction, since such interaction decreases as the square of the distances between the drops increases. The system is so constructed that the uncharged ink drops travel to ink gutter 22 while the charged ink drops go on to impact record medium 24. As is seen in FIG. 3 the vertical drift is reduced somewhat, but it is not eliminated. Ths is primarily due to the fact that aerodynamic interaction is still present. Thus, this technique of buffer or guard drops is only partially successful in aleviating the problem of drop interaction. Further, since the buffer drops are no longer available for printing, the print speed is significantly reduced rendering this technique even less attractive.

Figure 4:
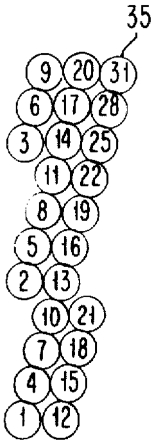
FIG. 4 demonstrates the result on non-sequential printing before correction.

FIG. 4 demonstrates the printed results when non-sequential printing is employed. In this particular example every third drop forms the "vertical" line being printed with the two intermediate drops also available for printing but for other "vertical" lines. The term "vertical line" is used here since the misalignment resulting from non-sequential printing is correctable, as discussed later. If the diameter of any dot on record medium 24 is designated as lambda, it is seen in FIG. 4 that no two adjacent dots are within three drop lambdas of each other. This, of course, also implies that the inflight distances of drops 19 are much greater when non-sequential printing is employed.

It is seen from FIG. 4 that the term non-sequential refers to the final location of the drops on the record material. In both sequential and non-sequential printing, the drops impact the record material in the same sequence as they issued from the nozzle; but in the non-sequential case, their final location is always spaced by at least one drop lambda. Increasing the inflight distance by non-sequential printing reduces both the electrostatic interaction and the aerodynamic interaction of the drops prevalent in this system, providing accurate drop registration without any reduction in the effective drop rate. The out-of-sequence order with which the drops are printed may be chosen at the designer convenience. As suggested in FIG. 4, the greater the inflight distance obtained, the greater the misalignment or slant of the printed line to the vertical. However, misalignment is not a critical factor since it may be easily corrected by various methods.

Figure 5:
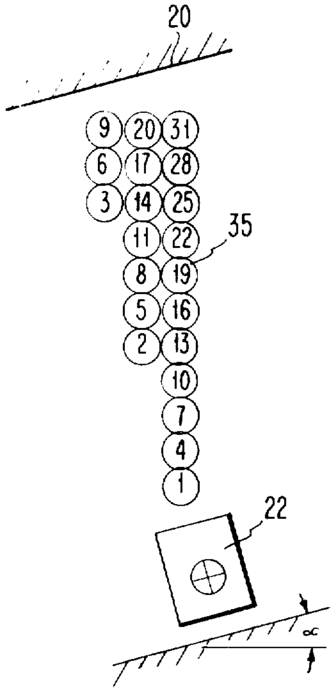
FIG. 5 shows a means of correcting the slight misalignment which results from non-sequential printing.

For example, FIG. 5 shows a means for correcting the misalignment by simply displacing the deflection plates 20 with respect to the print line a sufficient angle to return the printed drops to a vertical position. Another means of correcting this misalignment could be accomplished by a change in the bit train from the character generator or other information source. It is apparent from these suggested methods of correction that misalignment does not detract from the basic advantage of non-sequential printing.

Figure 6:
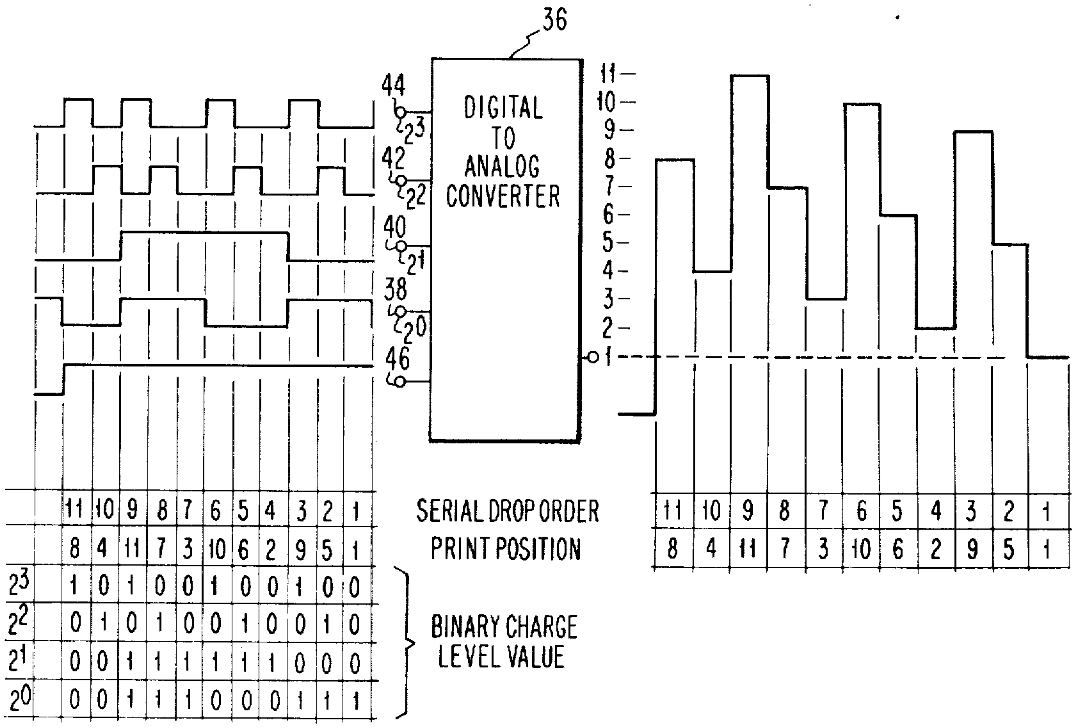
FIG. 6 shows an example of the construction of an analog non-sequential printing signal.

Non-sequential printing may be implemented by a modification to the video signal input means 28. When sequential printing techniques are employed, video signal input means 28 generates a stairstep-like waveform in which the higher voltage levels impact a larger charge upon the ink drops, resulting in a wider deflection before impact. The output of the video signal input means 28 is gated such that when the output is switched to zero the ink drops are not charged and enter ink gutter 22. By gating video signal input means 28 on and off information can be printed upon record medium 24. A similar gating technique may be employed in the non-sequential printing wherein a non-sequential output is generated such as shown in FIG. 6 and is gated by a character and symbol generator (not shown) such that information is printed upon record medium 24. FIG. 6 demonstrates how a gated digital-to-analog converter 36 may be employed to produce the proper output for charge electrodes 16. Binary inputs 38, 40, 42 and 44 are connected to digital generators which are programmed to generate digital pulses such that their binary sum represent the non-sequential output desired. The number of binary inputs is dependent upon the size of the matrix to be printed. In other words, if the output waveform in FIG. 6 required an amplitude of 15 units or greater, additional binary inputs would be required. If converter 36 continually generated an output, a solid dot matrix would be printed. By gating converter 36 with gate input 46, the output waveform is selectively turned on and off according to the information to be printed. If gated input 46 is connected to a signal and character generator (not shown), the signal and character generator is programmed so as to generate a non-sequential gating signal which is synchronized with the binary waveforms connected to converter 36. When other types of signal inputs which may not be pre-programmed are involved, they are first connected to a translator (not shown) which in turn presents the proper non-sequential gating signal to gate input 46. The various types of logic circuitry required to produce the non-sequential gated output of video signal input means 28 is well within the state of the art and need not be discussed further here.

While the invention has been particular shown and described with reference to preferred embodiment thereof, it will be understood by those of skill in the art that various changes in form and detail may be made therein without departing from the spirit and scope of the invention. For example, while the invention has been discussed with reference to ink jet printing, it should be noted that the techniques of non-sequential printing may be used with other types of non-impact printing systems in which drop interaction occurs. Further, the interaction which is reduced by this technique is not limited to aerodynamic and electrostatic forces but is also applicable to other forces. Still further, non-sequential printing can be employed in systems using multiple jets rather than just one as described here.

I claim:

1. A method of fluid drop recording in which drop registration is improved comprising the steps of:

vibrating the recording fluid prior to drop formation such that drops of uniform size and spacing are formed;

generating a sequential stream of individual drops, all of said drops being available for recording;

selecting ones of adjacent said drops of said sequential stream to be recorded at non-sequential recording locations on a record medium, each drop location being in a fixed matrical scan and separated in a first direction from the drop location of the immediately preceding drop of said sequential stream by at least one intervening drop location;

selecting others of said drops to be recorded at ones of said intervening non-sequential recording locations separated in a second direction from the drop location of said ones drops;

charging said adjacent drops of said sequential stream to be recorded for deflection by a static field to said non-sequential recording locations in separate colums on said recording medium; and electrostatically deflecting said charged drops with an electrostatic field.

2. The method of claim 1 wherein said deflecting steps additionally comprise forming said electrostatic field with a pair of deflection plates, and wherein said separate columns have a slant;

said method further comprising the step of:

rotating said pair of deflection plates through which said drops pass, prior to being recorded, an appropriate angle to correct said slant resulting from said deflecting steps.

3. A system for fluid drop recording having improved drop registration comprising:

means for vibrating the recording fluid prior to drop formation such that drops of uniform size and spacing are formed;

means for generating a sequential stream of individual drops, all of said drops being available for recording;

charging means for applying charging signals to said drops;

means for generating a fixed matrical sequence of charging signals for adjacent drops of said sequential stream, said charging signals having non-sequential charge level values, each charging signal being separated from the charging signals having the closest charge level values by at least one charging signal having a different charge level value;

means for selectively supplying ones of said sequences of charging signals to said charging means for charging selected ones of said drops of said sequential stream; and deflection means for deflecting said selected drops to non-sequential recording locations displaced in a first direction on a recording medium in accordance with the charge thereon, said deflection means being additionally arranged to direct adjacent ones of said selected drops of said sequential stream to said non-sequential recording locations displaced in a second direction in separate columns on said recording medium.

4. The system of claim 3 wherein said deflection means additionally includes:

a pair of deflection plates through which said drops pass prior to being recorded which are arranged to generate an electrostatic field therebetween at an appropriate angle to correct any slant of said columns of said non-sequential recording locations.

5. A system for fluid drop recording having improved drop registration comprising:

means for generating a sequential stream of individual drops, all of said drops being available for recording;

means for deflecting adjacent drops of said sequential stream in a fixed matrical scan at non-sequential recording locations in adjacent columns displaced in a first direction on a recording medium, each drop location being separated in a second direction from the drop location of the immediately preceding drop of sad sequential stream by at least one intervening drop location for another non-adjacent drop of said sequential stream; and means for selecting ones of said drops of said sequential stream for recording.

* * * * *